United States Patent
Fiscus et al.

(10) Patent No.: US 8,927,108 B2
(45) Date of Patent: Jan. 6, 2015

(54) FILMS INCORPORATING POLYMERIC MATERIAL COMBINATIONS, ARTICLES MADE THEREFROM, AND METHODS OF MAKING SUCH FILMS AND ARTICLES

(75) Inventors: David Michael Fiscus, Houston, TX (US); Narayanaswami Raja Dharmarajan, Houston, TX (US); Michael Charles Bulawa, Houston, TX (US)

(73) Assignee: ExxonMobil Chemical Patents Inc., Houston, TX (US)

( * ) Notice: Subject to any disclaimer, the term of this patent is extended or adjusted under 35 U.S.C. 154(b) by 633 days.

(21) Appl. No.: 11/639,789

(22) Filed: Dec. 15, 2006

(65) Prior Publication Data

US 2007/0160860 A1 Jul. 12, 2007

Related U.S. Application Data

(60) Provisional application No. 60/757,707, filed on Jan. 10, 2006.

(51) Int. Cl.
| | |
|---|---|
| *B32B 27/08* | (2006.01) |
| *C08L 23/00* | (2006.01) |
| *B32B 27/32* | (2006.01) |
| *C08J 5/18* | (2006.01) |
| *C08L 23/16* | (2006.01) |
| *B32B 27/20* | (2006.01) |
| *B32B 27/22* | (2006.01) |
| *C08L 23/10* | (2006.01) |

(52) U.S. Cl.
CPC .................. *C08L 23/00* (2013.01); *B32B 27/32* (2013.01); *C08J 5/18* (2013.01); *C08L 23/16* (2013.01); *B32B 27/08* (2013.01); *B32B 27/20* (2013.01); *B32B 27/22* (2013.01); *B32B 27/327* (2013.01); *C08J 2323/10* (2013.01); *C08L 23/10* (2013.01); *B32B 2250/242* (2013.01); *B32B 2270/00* (2013.01); *B32B 2307/31* (2013.01); *B32B 2307/5825* (2013.01); *B32B 2439/40* (2013.01); *B32B 2439/46* (2013.01); *B32B 2439/70* (2013.01)
USPC ............ 428/516; 428/515; 428/523; 525/240

(58) Field of Classification Search
CPC ................................ C08L 23/14; C08L 23/142
USPC ............................. 428/516, 515, 523; 525/240
See application file for complete search history.

(56) References Cited

U.S. PATENT DOCUMENTS

| | | | |
|---|---|---|---|
| 4,518,654 A | 5/1985 | Eichbauer et al. ............. 428/331 |
| 4,623,587 A * | 11/1986 | Ito et al. ......................... 428/335 |
| 4,643,945 A * | 2/1987 | Kiang ............................. 428/349 |
| 5,114,763 A | 5/1992 | Brant et al. ................... 428/34.9 |
| 5,141,809 A | 8/1992 | Arvedson et al. ............. 428/349 |
| 5,154,981 A | 10/1992 | Brant et al. .................... 428/520 |
| 5,173,343 A | 12/1992 | Arvedson et al. ............ 428/34.9 |
| 5,618,369 A * | 4/1997 | Peiffer et al. .................. 156/233 |
| 5,792,560 A * | 8/1998 | Friedman et al. ............. 428/441 |
| 5,998,039 A * | 12/1999 | Tanizaki et al. ............... 428/516 |
| 6,248,442 B1 * | 6/2001 | Kong et al. ............. 428/355 EN |
| 6,287,700 B1 * | 9/2001 | Kong et al. .................... 428/447 |
| 6,322,883 B1 * | 11/2001 | Williams ................... 428/308.4 |
| 6,423,420 B1 * | 7/2002 | Brant et al. .................... 428/516 |
| 6,458,469 B1 * | 10/2002 | DeLisio et al. ............... 428/516 |
| 6,492,010 B1 * | 12/2002 | Karaoglu et al. ............. 428/213 |
| 6,500,563 B1 | 12/2002 | Datta et al. .................... 428/521 |
| 6,642,316 B1 | 11/2003 | Datta et al. .................... 525/240 |
| 6,849,313 B2 * | 2/2005 | Mechelaere et al. ......... 428/35.2 |
| 6,852,424 B2 * | 2/2005 | Dharmarajan et al. ....... 428/516 |
| 6,919,407 B2 * | 7/2005 | Tau et al. ....................... 525/191 |
| 2001/0036544 A1 * | 11/2001 | Hori et al. ..................... 428/220 |
| 2002/0192483 A1 * | 12/2002 | Joly et al. ...................... 428/516 |
| 2003/0211298 A1 * | 11/2003 | Migliorini et al. .......... 428/195.1 |
| 2004/0053067 A1 * | 3/2004 | Dharmarajan et al. ....... 428/521 |
| 2004/0054040 A1 * | 3/2004 | Lin et al. ......................... 524/62 |
| 2004/0152842 A1 * | 8/2004 | Dunaway ...................... 525/240 |
| 2005/0058791 A1 * | 3/2005 | Moehlenbrock et al. .... 428/35.7 |
| 2005/0142367 A1 * | 6/2005 | Su et al. ......................... 428/461 |
| 2006/0159943 A1 | 7/2006 | Brant et al. .................... 428/515 |
| 2006/0247331 A1 * | 11/2006 | Coffey et al. ................. 523/351 |

FOREIGN PATENT DOCUMENTS

| | | | | |
|---|---|---|---|---|
| JP | 63179741 | * | 7/1988 | |
| WO | WO 95/16729 | | 6/1995 | ................ C08J 5/18 |
| WO | WO 02/083754 | | 10/2002 | ............ C08F 210/16 |
| WO | WO 2006/065663 | | 6/2006 | ............. C08L 23/10 |

OTHER PUBLICATIONS

Exact flyer from Exxon Co.*

* cited by examiner

*Primary Examiner* — Irina Krylova (57) ABSTRACT

Inelastic film structures including at least one layer incorporating a combination of a first polymeric component that is at least one polymer incorporating propylene-derived units and a second polymeric component that is a thermoplastic polymer, for example, a polymer incorporating a polyolefin, are provided. The combination of the first polymeric component and the second polymeric component incorporates from about 40 wt. % to about 98 wt. % of the at least one polymer incorporating propylene-derived units and from about 2 wt. % to about 60 wt. % of the at least one polymer incorporating a polyolefin. The film structures are found to have properties making the structures useful for inclusion in a variety of applications. In certain embodiments, the film structures may exhibit optical clarity, tack, sealability, toughness, softness, and machinability properties superior to conventional polypropylene films and other conventional polyolefin films.

11 Claims, 4 Drawing Sheets

FILMS INCORPORATING POLYMERIC MATERIAL COMBINATIONS, ARTICLES MADE THEREFROM, AND METHODS OF MAKING SUCH FILMS AND ARTICLES

CROSS REFERENCE TO RELATED APPLICATIONS

This application claims the benefit of Provisional Patent Application No. 60/757,707, filed Jan. 10, 2006.

FIELD OF THE DISCLOSURE

The disclosure relates to inelastic film structures including at least one layer incorporating a combination of a first polymeric component that is at least one polymer incorporating propylene-derived units and a second polymeric component that is at least one polymer incorporating an alpha olefin, articles made from such films, and methods of making such articles and films.

BACKGROUND INFORMATION

Conventional single layer polypropylene homopolymer films are generally limited to applications requiring slick, stiff films with minimal mechanical properties and toughness and high sealing temperatures. The absence of limited cling and adhesive properties of such films makes the films unsuitable for use in stretch film and shrink film applications. The high sealing temperature, minimal properties and toughness make these films unsuitable for use in applications requiring sealable films with good mechanical properties, and toughness. Poor mechanical properties and sealability also prevents using such films in form/fill/seal applications such as commonly used for packaging.

Typical properties of monolayer polypropylene homopolymer films are low coefficients of friction; low tack; high modulus values; good machine direction tensile for oriented films; low stretch; low tear resistance; and low puncture resistance. Such films are conventionally used in applications such as confection wraps, textile packaging, tape (diapers and labels), stationary products, medical goods and sanitary goods.

A wide variety of multi-layer films incorporating a polypropylene layer have been developed to expand the suitability of polypropylene films for more diverse applications. Exemplary multi-layer films are disclosed in U.S. Pat. No. 6,500,563.

Polypropylene film layers generally seal at temperatures greater than 150° C., making such films useful in only a small number of sealing applications. The polypropylene resins are often blended with other polyolefins to provide monolayer films with good seal performance. Additionally, polypropylene film layers are often coextruded with other polyolefin layers to produce film structures with sealable skin layers.

Polypropylene film resins are restricted to extrusion operations not requiring melt strength, such as cast film applications and injection molding applications. Alternatively, polypropylene resins may be combined with other polyolefins to produce blends useful in extrusion applications requiring melt strength, such as blown film and blow molding applications.

The mechanical properties of cast polypropylene films may be modified by (i) increasing the polypropylene resin's molecular weight, (ii) incorporating a comonomer, such as ethylene, into the resin or (iii) blending a rubber such as an ethylene-propylene copolymer with the resin. Increasing the molecular weight of the polypropylene requires orienting the films more than for films produced from lower molecular weight resins in order to obtain good physical properties. Incorporating a comonomer into the resin results in impact copolymers with random copolymers having good impact and tear resistance, but at the expense of stiffness and strength. Producing blends incorporating rubbers is expensive because the rubbers must be compounded from bale-form into the polypropylene resin and the compounded material used to make film.

U.S. Pat. No. 6,500,563 discloses blending a propylene copolymer component incorporating from 5 wt. % to 40 wt. % of an alpha-olefin with an isotactic propylene polymer component to produce a polymeric material suitable for producing films. The blend may contain from 0 wt. % to 95 wt. %, preferably 2 wt. % to 40 wt. % of the crystalline isotactic polypropylene and from 5 wt. % to 100 wt. %, preferably 60 wt. % to 98 wt. % of a crystallizable ethylene and propylene copolymer. These films are described as elastic films having specific set properties.

As noted above, it is known to blend two or more polymeric materials to achieve beneficial performance characteristics in the resulting polymeric composition. One such conventional blending process is the blending of elastomeric and thermoplastic polymeric materials. For example, as described in U.S. Pat. No. 6,642,316, it is known to blend ethylene propylene based interpolymers with polypropylene so as to provide a polypropylene dispersed phase and an elastomeric continuous matrix phase. The overall blend may be elastomeric in nature. The ethylene propylene based interpolymers may be of the type described in WO 02/083754.

It is also known to blend an inverse distribution of phases, where the continuous matrix phase is a polypropylene and the dispersed phase is an ethylene propylene based interpolymer. The blends of this type are often referred to as TPO's (Thermoplastic Polyolefins). The dispersed phase acts as an impact modifier and improves the impact strength of the original polypropylene polymeric material.

SUMMARY OF THE DISCLOSURE

The disclosure relates to inelastic film structures including at least one layer incorporating a combination of a first polymeric component that comprises a first polymer incorporating propylene-derived units and a second polymeric component that comprises a thermoplastic polymer. The combination of the first polymeric component and the second polymeric component incorporate from about 40 wt. % to about 98 wt. % of the first polymer incorporating propylene-derived units and from about 2 wt. % to about 60 wt. % of the thermoplastic polymer. In some embodiments, the film will exhibit a set greater than about 84.9%, in other embodiments at least 100%, in even other embodiments at least 125%, and in still other embodiments at least about 150%.

The film structures described herein are found to have properties that are useful and desirable for inclusion in a variety of sealing applications. In certain embodiments, the film structures may exhibit optical clarity, tack, sealability, toughness, softness, and machinability properties superior to conventional polypropylene films and other conventional polyolefin films.

The at least one layer of the inelastic film structures described herein includes at least one polymer having propylene-derived units and at least another thermoplastic polymer. The polymer having propylene-derived units is an elastomer having limited crystallinity resulting from a controlled disruption of isotactic propylene sequences of the polymer. The at least one other thermoplastic polymer may be any suitable thermoplastic polymer as desired, including any polymer incorporating an alpha olefin component such as those selected from a variety of polymeric materials including any various propylene and ethylene polymers.

The films described herein may include a wide variety of layers in addition to the layer incorporating the first and second polymeric components. However, in certain embodiments, the films described herein are monolayer structures in which the single layer incorporates the first and second polymeric components. In other embodiments, the film structures described herein include a layer incorporating the first and second polymeric components and a skin layer including a metallocene catalyzed linear low-density polyethylene. In even other embodiments, the film structures described herein include a layer incorporating the first and second polymeric components and a skin layer including a metallocene catalyzed linear low-density polyethylene as well as the first polymer component.

The films described herein are useful in a wide variety of applications: form-fill-and-seal packaging, liquid packaging (bag-in-box), and protective coating applications.

The at least one polymer having propylene-derived units and the at least one other thermoplastic polymer may be combined by any suitable method, including pellet-blending, batch mixing, twin-screw extrusion, melt-blending, Ferral continuous mixer, and by production in associated series and parallel reactors.

The disclosure also relates to a method of forming an article by adhering a section of the film herein described to another section of film, wherein the connecting sections can be a part of a single portion of film or can be on different film portions. The manner of adhering the films can be any now known or later developed method of adhering films. One non-limiting example of an article formed from the films includes a container.

DETAILED DISCLOSURE

The disclosure relates to inelastic film structures including at least one layer incorporating a combination of a first polymeric component that is at least one polymer incorporating propylene-derived units and a second polymeric component that is a thermoplastic polymer. The combination of the first polymeric component and the second polymeric component incorporate from about 40 wt. % to about 98 wt. % of at least one polymer incorporating propylene-derived units and from about 2 wt. % to about 60 wt. % of the thermoplastic polymer.

The films described herein exhibit superior performance to conventional polypropylene films. The superior properties are varied and may include an improved balance of the following properties:
  A) Optical clarity properties, such as low haze and gloss.
  B) Tack (reblock).
  C) Improved sealing capabilities, such as lower seal initiation temperature and broader seal plateaus.
  D) Enhanced toughness such as reflected in impact, tear and puncture resistance.
  E) Softness/feel—The films described herein may exhibit a feeling of softness and pliability while at the same time exhibiting machinability.

The films described herein are useful in a wide variety of applications requiring sealing of the film with itself. Additionally, the polymeric material combinations described herein are useful in other applications including, but not limited to extrusion coating, injection molding and blow molding applications. The toughness and sealability characteristics provided by the polymeric material combinations described herein to films may also be provided to products made by these processes.

As discussed above, the polymeric material combinations described herein are useful for producing inelastic films. For purposes of this disclosure, term "inelastic film" refers to a film exhibiting a permanent set value in some embodiments of greater than 84.9%, in other embodiments of at least 100%, in even other embodiments of at least 125%, and in still other embodiments of at least 150%. Permanent set refers to the change between the length of a material before and after its extension to a certain length for a certain time for a certain number of cycles. For example, the permanent set is the percent change in the original length of a material after extension of the material to 100% or 200% of its initial length. The "set" of a film can be determined by, elongating the film under a specified load, removing the applied load, and then measuring the final length of the film. The final length of the sample divided by the initial length is equal to the set. In one example, a 1 inch wide by 1 inch long sample is stretched to 200% (2 inches) and held at 200% stretch for 30 seconds; then the stretch is returned to 0% elongation while monitoring the load on the sample. In this example, the force drops from about 0.35 lbs force to less than 0.005 lbs force and is 0.000 lbs force at 1.926 inches of elongation. Thus the set for the sample in this example is 192.6%.

More specifically, in certain embodiments, the polymeric compositions provide additional control of processability, softness and service temperature without compromising the inelastic nature of certain polyolefin film materials.

As discussed above, the polymeric combinations incorporated into the at least one film layer include at least two polymeric components. The first polymeric component is at least one polymer incorporating propylene-derived units having a heat of fusion of less than 75 J/g with the propylene-derived units having an isotactic triad fraction of about 65% to about 99%. The second polymeric component is at least one thermoplastic polymer. In certain embodiments, the first polymeric component represents from about 40 wt. % to about 98 wt. % of the polymeric combination and the second polymeric component represents from about 2 wt. % to about 60 wt. % of the polymeric combination. In other embodiments, the first polymeric component represents from about 60 wt. % to about 98 wt. % of the polymeric combination and the second polymeric component represents from about 2 wt. % to about 50 wt. % of the polymeric combination. In additional embodiments, the first component represents from about 75 wt. % to about 98 wt. % of the polymeric combination and the second polymeric component represent from about 2 wt. % to about 25 wt. % of the polymeric combination. In still other embodiments, the first polymeric component represents from about 80 wt. % to about 98 wt. % of the polymeric combination and the second polymeric component represents from about 2 wt. % to about 20 wt. % of the polymeric combination. It should be pointed out that any of the aforementioned lower weight percentage limits can be combined with any of the aforementioned upper ranges, this may apply to both the first and the second polymeric components.

In certain embodiments, the combined weights of the first polymeric component and the second polymeric component comprise from about 25 wt. % to about 100 wt. % of the polymeric combination. In other embodiments, the combined weights of the first polymeric component and the second polymeric component comprise from about 60 wt. % to about 100 wt. % of the polymeric combination. In still other embodiments, the combined weights of the first polymeric component and the second polymeric component comprise from about 70 wt. % to about 100 wt. % of the polymeric combination. In additional embodiments, the combined weights of the first polymeric component and the second polymeric component comprise from about 80 wt. % to about 100 wt. % of the polymeric combination. In still other embodiments, the combined weights of the first polymeric component and the second polymeric component comprise from about 90 wt. % to about 100 wt. % of the polymeric combination. In still more embodiments, the combined weights of the first polymeric component and the second polymeric component comprise from about 95 wt. % to about 100 wt. % of the polymeric combination.

In certain embodiments, the polymeric combination, and any film structures formed therefrom, represents from about 60 wt. % to about 100 wt. % of the at least one layer of the inelastic film structures described herein. In other embodiments, the polymeric combination represents from about 70 wt. % to about 100 wt. % of the at least one layer of the inelastic film structures described herein. In further embodiments, the polymeric combination represents from about 80 wt. % to about 100 wt. % of the at least one layer of the inelastic film structures described herein. In still other embodiments, the polymeric combination represents from about 90 wt. % to about 100 wt. % of the at least one layer of the inelastic film structures described herein. In additional embodiments, the polymeric combination represents from about 95 wt. % to about 100 wt. % of the at least one layer of the inelastic film structures describe herein.

In certain embodiments, the propylene-derived units of the polymer having propylene-derived units of the polymeric compositions have isotactic triad fractions of about 65% to about 99%. In other embodiments, the propylene-derived units have isotactic triad fractions of about 70% to about 98%. In additional embodiments, the propylene-derived units have isotactic triad fractions of about 75% to about 97%.

In certain embodiments, the polymeric compositions may include a variety of other polymeric components and additives. The various components of the polymeric compositions may be combined by any suitable method such as blending, including melt blending. Additionally, two or more of the polymeric components of the compositions may be cross-linked.

Certain components of the polymeric combinations are described as follows.

Polymer Component Including Propylene-Derived Units (PPU)

The first polymeric component incorporating propylene-derived units ("PPU") has crystalline regions interrupted by non-crystalline regions. The non-crystalline regions may result from regions of non-crystallizable polypropylene segments and/or the inclusion of comonomer units. The crystallinity and the melting point of the PPU are reduced compared to highly isotactic polypropylene by the introduction of errors in the insertion of propylene and/or by the presence of comonomer.

In one embodiment, the PPU comprises at least 75 wt. % of propylene-derived units. In another embodiment, the PPU comprises from 75 wt. % to 95 wt. % of propylene-derived units. In still another embodiment, the PPU comprises from 80 wt. % to 90 wt. % of propylene-derived units.

In one embodiment, the PPU has a Shore A hardness of less than about 90. In another embodiment, the PPU a Shore A hardness of about 45 to about 90. In still another embodiment, the PPU has a Shore A hardness of about 55 to about 80.

In one embodiment, the PPU has an MFR of about 0.5 to about 200. In another embodiment, the PPU has an MFR of about 1 to about 100. In still another embodiment, the PPU has an MFR of about 1 to about 50.

The crystallinity of the PPU may be expressed in terms of heat of fusion. In certain embodiments, the PPU has a heat of fusion, as determined by DSC, ranging from a lower limit of 1.0 J/g, or 1.5 J/g, or 3.0 J/g, or 4.0 J/g, or 6.0 J/g, or 7.0 J/g, to an upper limit of 30 J/g, or 40 J/g, or 50 J/g, or 60 J/g, or 75 J/g. Without being bound by theory, it is believed that the PPU described herein has generally isotactic crystallizable propylene sequences, and the heats of fusion described above are thought to result from melting of these crystalline segments. In one embodiment, the PPU has a heat of fusion of less than 60 J/g. In certain embodiments, the level of crystallinity of the PPU is also reflected in a lower melting point.

In certain embodiments, the PPU has a weight average molecular weight ($M_w$) within the range having an upper limit of 5,000,000 g/mol, or 1,000,000 g/mol, or 500,000 g/mol, and a lower limit of 10,000 g/mol, or 15,000 g/mol, or 20,000 g/mol, or 80,000 g/mol, and a molecular weight distribution $M_w/M_n$ (MWD), sometimes referred to as a "polydispersity index" (PDI), within the range having an upper limit of 40, or 20, or 10, or 5, or 4.5, and a lower limit of 1.5, or 1.8, or 2.0.

In certain embodiments, the propylene-derived units of the PPU have an isotactic triad fraction of about 65% to about 99%. In other embodiments, the propylene-derived units of the PPU have an isotactic triad fraction of about 70% to about 98%. In still other embodiments, the propylene-derived units of the PPU have an isotactic triad fraction of about 75% to about 97%.

In some embodiments, the crystallinity of the PPU is reduced by the copolymerization of propylene with limited amounts of one or more comonomers selected from: ethylene, $C_4$-$C_{20}$ alpha-olefins, and polyenes. Preferred alpha-olefin comonomers are ethylene, butene, hexene or octene. In one embodiment, the PPU comprises at least 5 wt. % of the alpha-olefin comonomer units. In another embodiment, the PPU comprises about 10 wt. % to about 20 wt. % of the alpha-olefin comonomer units. In other embodiments, the PPU comprises from about 75 wt. % to about 95 wt. % propylene-derived units and from about 5 wt. % to about 25 wt. % of the ethylene-derived units. In still other embodiments, the PPU comprises from about 80 wt. % to about 95 wt. % propylene-derived units and from about 5 wt. % to about 20 wt. % the ethylene-derived units. In additional embodiments, the PPU comprises at least 70 wt. % of propylene-derived units and about 5.0 wt. % to about 30.0 wt. % of ethylene-derived units. Yet further optionally, the ethylene-derived units of the aforementioned PPU compositions can be from about 5 wt. % to about 16 wt. % or from about 6 wt. % to about 16 wt. % of ethylene-derived units.

The optional polyene units may be derived from any hydrocarbon structure having at least two unsaturated bonds wherein at least one of the unsaturated bonds may be incorporated into a polymer. For example, the optional polyene may be selected from straight chain acyclic olefins, such as 1,4-hexadiene and 1,6-octadiene; branched chain acyclic olefins, such as 5-methyl-1,4-hexadiene, 3,7-dimethyl-1,6-octadiene, and 3,7-dimethyl-1,7-octadiene; single ring alicyclic olefins, such as 1,4-cyclohexadiene, 1,5-cyclooctadiene, and 1,7-cyclododecadiene; multi-ring alicyclic fused and bridged ring olefins, such as tetrahydroindene, norbornadiene, methyl-tetrahydroindene, dicyclopentadiene, bicyclo-(2.2.1)-hepta-2,5-diene, alkenyl norbornenes, alkylidene norbornenes, cycloalkenyl norbornenes, and cylcoalkyliene norbornenes (such as 5-methylene-2-norbornene, 5-ethylidene-2-norbonene, 5-propenyl-2-norbornene, 5-isopropylidene-2-norbornene, 5-(4-cyclopentenyl)-2-norbornene, 5-cyclohexylidene-2-norbornene, and 5-vinyl-2-norbornene); and cycloalkenyl-substituted alkenes, such as vinyl cyclohexene, allyl cyclohexene, vinyl cyclooctene, 4-vinyl cyclohexene, allyl cyclodecene, vinyl cyclododecene, divinyl benzene, and tetracyclo (A-11,12)-5,8-dodecene.

In certain embodiments, the PPU incorporates from about 1 wt. % to about 12 wt. % and in even other embodiments to about 15 wt. % of polyene-derived units, based on the combined weight of the propylene-derived units and the alpha-olefin-derived units, if any. In other embodiments, the PPU incorporates from about 1.0 wt. % to about 9.0 wt. % of polyene-derived units, based on the combined weight of the propylene-derived units and the alpha-olefin-derived units, if any. In additional embodiments, the PPU incorporates from about 2.0 wt. % to about 7.0 wt. % of polyene-derived units, based on the combined weight of the propylene-derived units and the alpha-olefin-derived units, if any. In yet other embodiments, the PPU incorporates from about 3.0 wt. % to about 5.0 wt. % of polyene-derived units, based on the combined weight of the propylene-derived units and the alpha-olefin-derived units, if any.

In certain embodiments, the polyene-derived units are derived from 5-ethylidene-2-norbornene. In other embodiments, the polyene-derived units are derived from 5-vinyl-2-norbornene. In still other embodiments, the polyene-derived units are derived from divinyl benzene.

The polymeric combinations described herein are not limited by any particular polymerization method for preparing the PPU of the invention, and the polymerization processes described herein are not limited by any particular type of reaction vessel.

In certain embodiments, the catalyst system used to produce the PPU includes one or more transition metal compounds and one or more activators. When alumoxane or aluminum alkyl activators are used, the combined pre-catalyst-to-activator molar ratio is from 1:5000 to 10:1. When ionizing activators are used, the combined pre-catalyst-to-activator molar ratio is from 10:1 to 1:10. Multiple activators may be used, including using mixtures of alumoxanes or aluminum alkyls with ionizing activators. In other embodiments, the methods and catalyst systems disclosed in U.S. Pat. No. 6,881,800 to Friedersdorf may be used to produce the PPU. In still other embodiments, the PPU may be produced using catalyst systems such as the nonmetallocene, metal-centered, heteroaryl ligand catalyst systems as described in U.S. Patent Application 20030204017 published Oct. 30, 2003.

Exemplary PPU's are commercially available from ExxonMobil Chemical Company under the tradename VISTAMAXX™ and from The Dow Chemical Company under the tradename VERSIFY™.

For further general process condition information suitable for use in preparing the PPU's, see U.S. Pat. No. 5,001,205 and PCT publications WO 96/33227 and WO 97/22639. For further information on gas phase polymerization processes, see U.S. Pat. Nos. 4,543,399; 4,588,790; 5,028,670; 5,317,036; 5,352,749; 5,405,922; 5,436,304; 5,453,471; 5,462,999; 5,616,661; 5,627,242; 5,665,818; 5,668,228; and 5,677,375, and European publications EP-A-0 794 200; EP-A-0 802 202; and EP-B-634 421. For information relating to methods of introducing liquid catalyst systems into fluidized bed polymerizations into a particle lean zone, see U.S. Pat. No. 5,693,727. For further information on slurry polymerization processes, see U.S. Pat. Nos. 3,248,179 and 4,613,484. PCT publication WO 96/08520 and U.S. Pat. No. 5,712,352 describe a polymerization process operated in the absence of or essentially free of any scavengers, although the use of scavengers is contemplated for producing the PPU described herein.

Polymeric Component Including A Polyolefin (POC)

The second polymeric component is generally one or more thermoplastic polymers. As an exemplary example, the second polymeric component is at least one polymer incorporating a polyolefin ("POC"). The olefin of the POC's may be a $C_2$ to $C_{20}$ linear, branched, or cyclic olefin.

Specific exemplary POC's include a wide variety of propylenes and polyethylenes. With respect to the polypropylenes, the POC may be a polypropylene homopolymer, or a copolymer of propylene incorporating two or more monomer units, or mixtures thereof. Such mixtures are commonly known as reactor copolymer (RCP) or impact copolymer (ICP). Polypropylene POC's may have the following characteristics:

(A) The polypropylene is predominately crystalline, i.e., it has a melting point generally greater than 110° C. in certain embodiments, greater than 115° C. in other embodiments, and greater than 130° C. in still other embodiments. The POC may have a heat of fusion greater than 60 J/g as determined by DSC analysis in certain embodiments, at least 70 J/g in other embodiments, and at least 80 J/g in other embodiments.

(B) The composition of the polypropylene POC may vary widely. For example, substantially isotactic polypropylene homopolymer or propylene copolymers containing equal to or less than 10 weight percent of other monomer, i.e., at least 90% by weight propylene, may be used. Further, the polypropylene can be present in the form of a graft or block copolymer, in which the blocks of polypropylene have substantially the same stereoregularity as the propylene-alpha-olefin copolymer so long as the graft or block copolymer has a sharp melting point above 110° C. in certain embodiments, above 115° C. in other embodiments, and greater than 130° C. in additional embodiments, as characteristic of stereoregular propylene sequences. The propylene polymer POC may be a combination of homopolypropylene, and/or random, and/or block copolymers. When the above propylene polymer POC is a random copolymer, the percentage of the copolymerized alpha-olefin in the copolymer is, in general, up to 9 wt. % in certain embodiments, 2 wt. % to 8 wt. % in other embodiments, and 2 wt. % to 6 wt. % in additional embodiments. Exemplary alpha-olefins contain 2 or from 4 to 12 carbon atoms. In certain embodiments, the alpha-olefin is ethylene. One or more alpha-olefins may be copolymerized with propylene to produce the POC's described herein.

(C) The molecular weight of the propylene POC may be between 10,000 to 5,000,000 g/mol in certain embodiments, 50,000 to 500,000 g/mol in other embodiments, 30,000 to 500,000 g/mol in other embodiments, with a poly dispersity index (PDI) from 1.5 to 40.0.

There is no particular limitation on the method for preparing the propylene POC. However, in general, the propylene POC is a propylene homopolymer obtained by homopolymerization of propylene in a single stage or multiple stage reactor. Copolymers may be obtained by copolymerizing propylene and an alpha-olefin having 2 or from 4 to 20 carbon atoms, preferably ethylene, in a single stage or multiple stage reactor. Polymerization methods include high pressure, slurry, gas, bulk, or solution phase, or a combination thereof, using a traditional Ziegler-Natta catalyst, single-site catalyst, and metallocene catalyst system. The catalyst used is preferably one which has a high isospecificity. Polymerization may be carried out by a continuous or batch process and may include use of chain transfer agents, scavengers, or other such additives as deemed applicable. The propylene polymer POC may also be comprised of commonly available isotactic polypropylene compositions referred to as impact copolymer or reactor copolymer. However these variations in the identity of the propylene polymer POC are acceptable in the blend only to the extent that all of the components of the propylene polymer POC are substantially similar in composition and the propylene polymer POC is within the limitations of the crystallinity and melting point indicated above. The propylene polymer POC may also contain additives such as flow improvers, nucleators and antioxidants which are normally added to isotactic polypropylene to improve or retain properties.

Exemplary polypropylenes are those commercially available from ExxonMobil Chemical Company under the designations PP 2252, PP 4352F1, PP 4772, PP 4712E1, PP 1052, PP1043N, PP 5341E1, PP 7032E2, PP 9122, Exxtral HMR 402 300040, Exxtral BMT 221, PP 7033L1, PP 7905, PP 8023, PP 8224E1, AX038E3, PP 5262, PP 1572, PP 1024E1, PP 1074E1, PP 3746, PP 4042E3, PP 4342C2, EXP019, PP 3133, Achieve 3854, Achieve 1605.

As discussed, the POC's may be ethylene polymers. The ethylene polymers may be ethylene homopolymers and ethylene copolymers incorporating one or more comonomers. Exemplary ethylene polymer POC's include low-density polyethylene ("LDPE"), linear low-density polyethylene ("LLDPE"), and high-density polyethylene ("HDPE"). Generally, LDPE has a density of about 0.900 to about 0.925 g/cm$^3$, linear low-density polyethylene (LLDPE) has a density of about 0.910 to about 0.940 g/cm$^3$, and high-density polyethylene (HDPE) with a density of about 0.940 to about 0.960 g/cm$^3$.

Various types of polyethylenes are known in the art. Low-density polyethylene ("LDPE") can be prepared at high pressure using free radical initiators. LDPE is also known as "branched" or "heterogeneously branched" polyethylene because of the relatively large number of long chain branches extending from the main polymer backbone. The LDPE may have a MWD of about 1.5 to about 10, a melt index greater than about 0.25, and includes at least 99 wt. % of ethylene monomer units. In certain embodiments, the LDPE polymers have a density of 0.89 g/cm$^3$ to 0.94 g/cm$^3$ and a MWD of about 4 to about 10 and a melt index of about 0.25 to about 50. In other embodiments, the LDPE polymers have a density of 0.89 g/cm$^3$ to 0.94 g/cm$^3$ and a MWD of about 4 to about 7 and a melt index of about 0.25 to about 30.

LLDPE's are copolymers of ethylene and alpha-olefins. Such alpha-olefins will generally have 3 to 20 carbon atoms. Polymers of ethylene and one or more or these alpha-olefins are contemplated. In certain embodiments, the alpha-olefins are selected from butene-1, pentene-1,4-methyl-1-pentene, hexene-1, octene-1, decene-1, and combinations thereof. In other embodiments, the alpha-olefins are selected from butene-1, hexene-1, octene-1, and combinations thereof. The LLDPE's may be produced from any suitable catalyst system including conventional Ziegler-Natta type catalyst systems and preferably metallocene based catalyst systems. Exemplary metallocene catalyzed linear low density polyethylenes described herein are commercially available from ExxonMobil Chemical Company under the designation Exceed™.

The HDPE includes polymers made using a variety of catalyst systems including Ziegler-Natta, Phillips-type catalysts, chromium based catalysts, and metallocene catalyst systems which may be used with alumoxane and/or ionic activators. Processes useful for preparing such polyethylenes include gas phase, slurry, solution processes, and the like.

The HDPE is a semicrystalline polymer available in a wide range of molecular weighs as indicated by either MI or HLMI (melt index or high-load melt index) and includes an ethylene content of at least 99 mole percent based upon the total moles of the HDPE. If incorporated in the HDPE, comonomers may be selected from butene and other $C_3$ to $C_{20}$ alpha olefins. In one embodiment, the comonomers are selected from 1-butene, 4-methyl-1-pentene, 1-hexene, and 1-octene, and mixtures thereof. If included in the HDPE, in one embodiment, the comonomers will be present up to about 0.68 mole percent, based on the total moles of the HDPE. In another embodiment, the commoners are present at up to about 0.28 mole percent.

In one embodiment, the density of the HDPE is greater than 0.94 g/cm$^3$ as defined by ASTM. In another embodiment, the HDPE has a density of about 0.94 g/cm$^3$ to about 0.97 g/cm$^3$. In a third embodiment, the density of the HDPE is from about 0.95 g/cm$^3$ to about 0.965 g/cm$^3$.

In certain embodiments, the melting point of the HDPE, as measured by a differential scanning calorimeter (DSC), is from about 120° C. to about 150° C. In other embodiments, the melting point of the HDPE is from about 125° C. to about 135° C. In one embodiment, the HDPE has a melt index of from about 0.1 to about 10.0. In a second embodiment, the melt index of the HDPE is from about 0.2 to about 5.0. In a third embodiment, the melt index of the HDPE is from about 0.6 to about 2.0.

Exemplary HDPE's are commercially available as Marlex TR-130 from Phillips Chemical Company, M6211 from Equistar, Chemical Co., and Dow XU 6151.302 from Dow Chemical Co., HD 7845, HD 6733, HTA 002, HTA 108, HYA 108, Paxon 4700, AD60 007, AA 45004, BA50 100, Nexxstar™ 0111 and MA001 from ExxonMobil Chemical Company, among others.

Additional Components

As mentioned above, the polymeric combinations described herein may include additional components in addition to the PPU and POC components described above, such as those described in the following.

Cross-linked Polymer Components

In one embodiment, the inelastic performance properties of the PPU may be improved by crosslinking the PPU, and/or the other polymeric components of the polymeric compositions described herein, to various degrees. In another embodiment, the PPU is cross-linked to various degrees to permit convenient processing. In some embodiments, as described above, the PPU may include a polyene to facilitate crosslinking and optimal end use performance in various options of formulation and processing. In other embodiments, such as when using radiation to induce the crosslinking reaction, the presence of diene in the PPU is optional.

The curing may be carried out to varying degrees. Initially, polymer chains may be incorporated into other chains to form long chain branches. These polymers are more shear sensitive and easier to process. These properties may be accessed by determining the viscosity ratio under different shear conditions. For most applications, the polymer should remain capable of thermoplastic flow following curing. Curing may provide improved recovery from tensile deformation, improved stress relaxation, and prevent loss of shape of molded or extruded product and increase the service temperature for the article. The degree of crosslinking may vary and can be measured by determining the wt. % of insolubles in boiling xylene that, in one embodiment, may vary from about 10 wt. % to about 90 wt. %. Continued curing may lead to gelling and finally to the immobilization of the polymers from extensive crosslinking.

Curing may be effected by any suitable system capable of dehydrogenating the polymer chain, such as by using free radicals. In one embodiment, curing is accomplished through irradiation. Curing may also be effected chemically using functionalities in the polymer such as unreacted unsaturated end moieties that remain after diene incorporation. The crosslinking reaction may then be referred to as vulcanization. A crosslinking agent is used to activate the functionality such as sulfur based curatives, peroxide curatives, phenolic resin cure, hydroxylation, and labile or migratory cure systems such as sulfur dichloride.

Additives

The polymeric combinations described herein may include one or more additive components in addition to the polymer components described above. Various additives may be present to enhance a specific property or may be present as a result of processing of the individual components. Additives which may be incorporated include, but are not limited to, fire retardants, antioxidants, plasticizers, pigments, vulcanizing or curative agents, vulcanizing or curative accelerators, cure retarders, processing aids, flame retardants, tackifying resins, flow improvers, and the like. Antiblocking agents, coloring agents, lubricants, mold release agents, nucleating agents, reinforcements, and fillers (including granular, fibrous, powder-like, or nano-composites) may also be employed. Nucleating agents and fillers may improve the physical properties of films incorporating the polymeric combinations. The list described herein is not intended to be inclusive of all types of additives which may be employed with the present invention.

It will be appreciated that other additives may be employed to enhance properties of the combinations. As is understood by those skilled in the art, the polymeric compositions may be modified to adjust the characteristics of the blend as desired.

The polymeric combinations described herein may also contain inorganic particulate fillers, which may improve the mechanical and wear properties of the compositions, particularly in combinations including cross-linked components. The amount of inorganic filler used is typically less than 60 wt. %, or less than 50 wt. %, or less than 40 wt. %, or less than 30 wt. %, based on the total weight of the combination. The inorganic fillers include particles less than 1 mm in diameter, rods less than 1 cm in length, and plates less than 0.2 cm$^2$ in surface area. Exemplary particulate fillers include carbon black, clays, titanium and magnesium oxides, and silica. In addition, other particulate fillers, such as calcium carbonate, zinc oxide, whiting, and magnesium oxide, can also be used. An example of a rod-like filler is glass fiber. An exemplary plate-like filler is mica. The addition of very small particulates, commonly referred to as nanocomposites, is also contemplated. The addition of the fillers may change the properties of the compositions described herein. For example, polymeric combinations including inorganic filler may have improved thermal stability and resistance to wear. The addition of fillers beyond a certain level may lead to a dramatic increase in the viscosity and a corresponding decrease in processability. This threshold level is referred to as the percolation threshold. In addition to the increase in viscosity, the percolation threshold is accompanied by an improvement in the elastic properties, and at levels slightly higher than the percolation threshold there is a drop in the elastic recovery of the blend. The percolation threshold is attained at different levels of addition of fillers depending on the type of filler used. Generally, the percolation threshold is attained at lower levels for fillers with a smaller size than for fillers with a larger size.

The polymeric combinations described herein may contain at least one process oil in the range of from 0 to 500 parts by weight, or from 2 to 200 parts by weight, or from 5 to 150 parts by weight, or from 10 to 100 parts by weight, per hundred parts of total polymeric components. For purposes of this disclosure, the term "process oil" refers to any or a variety of oils having molecular weights (Mn) of less than 20,000 g/mol.

Adding antioxidants to the polymeric combinations described herein may improve the long-term aging of the combinations. Examples of antioxidants include, but are not limited to quinolein, e.g., trimethylhydroxyquinolein (TMQ); imidazole, e.g., zincmercapto toluyl imidazole (ZMTI); and conventional antioxidants, such as hindered phenols, lactones, and phosphites. In certain embodiments, the amount of antioxidants used may be within the range of from 0.001 to 5 pph by weight of the polymeric components.

The polymeric combinations described herein may include one or more non-functionalized plasticizers ("NFP's") where the non-functionalized plasticizer has a kinematic viscosity ("KV") of 2 cSt or more at 100° C. For purposes of this disclosure, if the NFP has a flash point of less than 100° C. it is defined to have a KV at 100° C. of less than 2 cSt. In certain embodiments, the non-functionalized plasticizer is polyalpha-olefin oligomers of $C_5$ to $C_{14}$ olefins having a KV of 10 cSt or more at 100° C. and a viscosity index of 120 or more. In other embodiments, the non-functionalized plasticizers incorporate oligomers of $C_5$ to $C_{14}$ olefins having a viscosity index of 120 or more. In additional embodiments, the non-functionalized plasticizers include oligomers of $C_6$ to $C_{14}$ olefins having viscosity index of 120 or more. In still other embodiments, the non-functionalized plasticizers include linear and/or branched paraffinic hydrocarbon compositions produced by one or more gas to liquids process having a number average molecular weight of 500 to 20,000. For additional information regarding non-functionalized plasticizers, see PCT published applications WO 04/014998.

In certain embodiments, the polymeric combinations described herein incorporate form about 1 wt. % to about 95 wt. % of one or more non-functionalized plasticizers having a KV of at least 2 cSt at 100° C. In other embodiments, the polymeric combinations described herein incorporate form about 5 wt. % to about 85 wt. % of one or more non-functionalized plasticizers having a KV of at least 2 cSt at 100° C. In still other embodiments, the polymeric compositions described herein incorporate from about 5 wt. % to about 75 wt. % of one or more non-functionalized plasticizers having a KV of at least 2 cSt at 100° C. In certain embodiments, the flashpoint of the non-functionalized plasticizers is at least 200° C. In other embodiments, the flashpoint of the non-functionalized plasticizers is at least 195° C. In still other embodiments, the flashpoint of the non-functionalized plasticizers is at least 190° C.

In certain embodiments, the polymeric combinations described herein include about 1 wt. % to about 60 wt. % of an additive selected from the group consisting of a filler, a pigment, a coloring agent, a processing oil, a plasticizer, and mixtures thereof. In other embodiments, the polymeric combinations described herein include about 5 wt. % to about 50 wt. % of an additive selected from the group consisting of a filler, a pigment, a coloring agent, a processing oil, a plasticizer, and mixtures thereof. In still other embodiments, the polymeric compositions described herein include about 10 wt. % to about 40 wt. % of an additive selected from the group consisting of a filler, a pigment, a coloring agent, a processing oil, a plasticizer, and mixtures thereof.

As discussed above, the polymeric combinations described herein may be produced by combining the polymeric components during production in multiple associated reactors such as two or more reactors producing the desired polymeric components in associated series or parallel reactors.

Production of Films From Polymeric Combinations

As discussed above, the unique combination of processability and performance attributes of the polymeric compositions described herein make them useful to produce at least one film layer suitable for inclusion in a variety of multiple or single layer film structures.

Methods for producing the films incorporating at least one layer including the polymeric combinations include those which are well known to those of ordinary skill in the art, including, but not limited to conventional tubular extrusion, or a blown bubble process, and cast extrusion. The extrusion temperatures, die temperatures, and chill roll temperatures are dependent on the composition of the polymeric composition employed, but will generally be within the following ranges for the compositions described herein: melt temperature, 170° C. to 250° C.; die temperature, 170° C. to 250° C.; and chill roll temperature, 10° C. to 65° C. The film making processes may also include embossing rolls to chill and form the film.

The films may have a layer adhered to one or both surfaces of the at least one film layer incorporating the polymeric compositions described herein. The layers may be adhered by coextrusion with the at least one layer described herein with the optional additional layer or layers. In coextruded films, the individual layers may be the same or different in composition, and when different in composition, retain their respective compositions except at the interface layer. The optional additional layer may be, for example, a soft material such as an ethylene copolymer that may reduce the adhesive (i.e., sticky) feel of the inventive film. The optional additional layer may also be, for example, a thermoplastic. The thermoplastics that may be used for this purpose include, but are not limited to polypropylene and polyethylene.

In certain embodiments, the film structures described herein incorporating the at least one layer incorporating the polymeric compositions described herein may include at least one layer incorporating at least one metallocene catalyzed linear low-density polyethylene. In certain embodiments, the at least one layer incorporating at least one metallocene catalyzed linear low-density polyethylene is a skin layer on one surface of the at least one film layer including the polymeric combinations described herein. In certain embodiments, films incorporating the at least one layer incorporating at least one metallocene catalyzed linear low-density polyethylene and the at least one film layer including the polymeric combinations described herein is a two layer film. In certain embodiments, such two-layer films include at least one layer incorporating the polymeric compositions described herein having a thickness of about 6 μm to about 300 μm and at least one layer incorporating the at least one metallocene catalyzed linear low density polyethylene having a thickness of about 0.7 μm to about 25 μm. Exemplary metallocene catalyzed linear low density polyethylenes described herein are commercially available from ExxonMobil Chemical Company under the designation Exceed™. Additionally, other metallocene catalyzed linear low density polyethylenes are available from Dow Chemical under the designation of ELITE™.

Thermal annealing is conducted by maintaining the polymer blend or article made from the blend at a temperature between room temperature and 160° C. for a period of from 15 seconds to 7 days. A typical annealing period is 3 days at 50° C. or 5 minutes at 100° C. The annealing time and temperature can be adjusted for any particular blend composition by experimentation. It is believed that during this annealing process, there is intermolecular rearrangement of the polymer chains, leading to a material with greater recovery from tensile deformation than the unannealed material.

Mechanical orientation can be done by the temporary, forced extension of the film along one or more axis for a short period of time before it is allowed to relax in the absence of extensional forces. It is believed that the mechanical orientation of the polymer leads to reorientation of the crystallizable portions of the blend. Orientation is conducted by maintaining the polymer blend or article made from the blend at an extension of 10% to 400% for a period of 0.1 seconds to 24 hours. A typical orientation is an extension of 200% for a momentary period (generally less than 1 minute) at room temperature.

Orientation of a film may be carried out in the machine direction (MD) or the transverse direction (TD) or both directions (biaxially) using conventional equipment and processes. For orientation in the MD, a polymeric film at an elevated temperature, but below the crystalline melting point of the polymer, is passed from a feed roll of film around two rollers driven at different surface speeds and finally to take-up rollers. The driven roller closest to the take-up rolls is driven faster than the driven roller closest to the feed roll, such that the film is stretched between the driven rollers. The assembly may include a roller intermediate to or between the second roller and take-up rollers to cool the film. The second roller and the take-up rollers may be driven at the same peripheral speeds to maintain the film in the stretched condition. If supplementary cooling is not used, the film will cool to ambient temperature on the take-up rollers. The degree of stretch will depend on the relative peripheral speeds of the driven rollers and the distance between the rollers. Stretch rates of 50%/minute to 500%/minute will be satisfactory for most MD orientation applications.

For orientation in the TD, the film orientation is carried out in a tentering device. The film is cast or unwound from a film roll and then gripped by the edges for processing through the orientation steps. The film is passed successively through a preheat step, a stretching step at elevated temperatures (e.g., from 37° C. to a temperature slightly below the crystalline melting point of the ethylene crystallizable copolymer), an annealing step, and finally a cooling step. During the steps of preheating and stretching and a portion of the annealing step, the temperature is controlled at an elevated temperature, but below the crystalline melting point of the polymer. Tension may be maintained on the film during the annealing and cooling steps to minimize shrinkback. Upon cooling to ambient temperature, i.e., room temperature, or near ambient, the holding force may be released. The film may contract somewhat (snapback) in the TD, but will retain a substantial portion of its stretched length. The tenter operating conditions can vary within relatively wide ranges and will depend on the several variables including, for example, film composition, film thickness, degree of orientation desired, and annealing conditions.

As indicated earlier, the orientation process may include an annealing step. Annealing partially relieves the internal stress in the stretched film and dimensionally stabilizes the film for storage. Annealing may be carried out in a time and temperature dependent relationship.

In particular film orientation embodiments, an interdigitating grooved roller assembly is used to simultaneously produce a desirable crinkled surface finish and orient the film. Such processes are described in U.S. Pat. No. 4,368,565. In this process, the film is stretched between two interlocking grooved rollers which are able to both biaxially stretch the film and orient it.

Properties of Films From Polymeric Compositions

In certain embodiments, inclusion of polymeric combinations with about 40 wt. % to about 80% wt. % of the PPU improves the optical properties of monolayer films. For example, haze may decrease to about 0.24% to about 0.42% from typical values of about 3.24% for conventional polypropylene homopolymer single layer films. Additionally, gloss may increase to greater than 89 from less than 80.

In certain embodiments, inclusion of polymeric combinations with about 40 wt. % to about 80% wt. % of the PPU increases the tack of polypropylene homopolymer films. For example, such films may exhibit reblock (I/I) values of greater than 182 g as compared to values of approximately 64.7 g for conventional polypropylene homopolymer single layer films.

In certain embodiments, inclusion of polymeric combinations with about 40 wt. % to about 80% wt. % of the PPU increases the toughness of polypropylene homopolymer single layer films. For example, such films may exhibit Dart Drop values of about 94.6 g/mil to about 105.2 g/mil as compared to typically values of less than 50 g/mil for conventional polypropylene homopolymer single layer films.

In certain embodiments, inclusion of polymeric combinations with about 40 wt. % to about 80% wt. % of the PPU may exhibit tear resistance (Average MD/TD Elmendorf Tear) values of about 18.4 g/micron to about 29.1 g/micron as compared to values of less than 16.0 g/micron for conventional polypropylene homopolymer single layer films.

Additionally such inventive propylene homopolymer films may exhibit Peak Puncture Force values of about 0.79 Newtons/micron to about 0.88 Newtons/micron as compared to values of about 0.71 Newtons/micron for conventional polypropylene homopolymer single layer films.

Also, such inventive propylene homopolymer films may have Puncture Break Energy values of about 0.04 Joule/micron to about 0.06 Joule/micron as compared to values of about 0.02 Joule/micron for conventional polypropylene homopolymer single layer films.

In certain embodiments, inclusion of polymeric combinations with about 40 wt. % to about 80% wt. % of the PPU increases the softness/feel of polypropylene films as evidence by 1% MD Secant Modulus values of about 76 MPa to about 269 MPa as compared to values of 862 MPa for conventional polypropylene homopolymer single layer films.

The following experimental evaluations are illustrative of non-limiting specific embodiments of the films of the present disclosure. The embodiments described herein are particularly useful in applications requiring sealability and/or resealability; adult care items, such as adult diapers; agricultural films; aluminum foil laminates; aluminum laminates; asphalt films; auto panel films; bacon packaging; bag-in-box liquid packaging applications; bakery goods; banana film; batch inclusion bags; bathroom tissue; biaxially oriented films; biaxially oriented polypropylene (BOPP) films; biscuits; boutique bags; bread bags; bubble wrap; building film; cake mix packaging; can liners; candy; cardboard liquid packaging; carpet film; carry-out sacks; cement packaging; cereal liners; cheese packaging; chemical; clarity films; clean room applications, such as curtains and floor mats; coffee packaging; coin bags; collation shrink films; confections; construction; construction sheeting; construction film; consumer goods; consumer trash bags; continuous wrap; convenience packaging; cosmetics packaging; counter bags; cover film; cup/cutlery overwrap; deli and bakery wrap; deli wrap; detergent packaging; diaper backsheet; disposables (diapers; sanitary; etc); dry food packaging; dry grains; dunnage bags; fertilizer; fish & seafood; food packaging; foundation film; freeze-dried products; freezer films; frozen food; fruit juice packaging; furniture bags; garden sacks; garment bags; geomembrane liners; gloves; glove packaging; gravel packaging; green house films; grocery sacks; heavy duty-sacks; high clarity collation shrink film; high clarity films; high speed packaging applications; high stiffness overwrap film; horizontal form-fill-and-seal (HFFS) packaging; household wrap; hygiene overwrap films; ice bags; industrial hardware; industrial liner; industrial trash bags; industrial spare parts; in store self-service; insulation bags; institutional liners; juice bags; kitchen rolls; landscaping bags; lamination films; light duty shrink film; lime bags; liners; liquid packaging; liquid and granular food packaging; low stiffness overwrap film; magazine overwrap; mailer bags; mailers envelopes/sacks; masking film; mayonnaise packaging; meat, such as meat packaging; medical applications; such as Band-Aids, incision drape and medical curtains, drapes and tape and other medical products; medium duty bags; merchandise bags; metallized laminates; military hardware; milk bags; milk powder packaging; modified atmosphere packaging; mulch film; multi-wall sack liner; newspaper bags; nose tissue; olive oil packaging; oriented films; oriented polypropylene (OPP) films; packaging of beans; packaging of cementitious products such as grout; packaging of dry and sharp products; pallet shrink film; pancake batter bags; paper handkerchief overwrap; paper laminates; pasta; pasta overwrap; pelletized polymer; perfumes; personal care; pesticides; pharmaceuticals packaging; pigments; pizza; polyamide laminates; polyester laminates; potato products; potting soil; pouches; poultry; poultry packaging; pre-formed pouches; produce; produce bags; produce packaging; protective film for electronic components and automotive parts etc.; rack and counter film; ready made food packaging; ready meals; retortable products; rubber industry; sandwich bags; salt bags; sausage packaging; seafood packaging; shipping sacks; shrink bags; shrink bundling film; shrink film; shrink shrouds; shrink tray; shrink wrap; snack food packaging; soft drink packaging; soil; soups; spices; stand up pouches; storage bags; stretch films; stretch hood; stretch wrap; stretch cling films; supermarket bags; surgical garb; take out food bags; textile refuse; thermoformed containers; thin films; tissue overwrap; tissues; tobacco packaging; tomato ketchup packaging; trash bags, such as 50 gallon bags; 30 gallon bags; 20 gallon bags and 10 gallon bags; t-shirt bags; vacuum skin packaging; vegetables; vertical form-fill-and-seal (FFS) packaging; water bottle packaging; wet-pack; and wrap. All parts and percentages are by weight unless otherwise noted.

Experimental Evaluations

Monolayer cast films with thicknesses of up to 31.25 µm were produced from blends with varying ratios of a propylene copolymer, having an ethylene content of 11 wt %, a density of about 0.871 g/cm3, a MFR (230° C., 2.16 kg) of about 8 g/10 min, a heat of fusion of about 28.8 J/g and a melting point of about 62° C., commercially available from ExxonMobil Chemical Company under the designation Vistamaxx™ 3000 (VM 3000) and a polypropylene homopolymer commercially available from ExxonMobil Chemical Company under the designation PP 2252. The films are described in Table 1.

TABLE 1

Monolayer Cast Vistamaxx ™ - PP 2252 Films

| Sample # | Composition (Percent) VM 3000 | PP 2252 | Target Thickness (micron) |
|---|---|---|---|
| 001 | 0 | 100 | 31.75 |
| 002 | | | 12.7 |
| 003 | 40 | 60 | 25.4 |
| 004 | | | 12.7 |
| 005 | 60 | 40 | 31.75 |
| 006 | | | 25.4 |
| 007 | | | 19.05 |
| 008 | | | 12.7 |
| 009 | 80 | 20 | 31.75 |
| 010 | | | 25.4 |
| 011 | | | 19.05 |
| 012 | 90 | 10 | 31.75 |

A Black Clawson line equipped with a 3½" (88.9 mm) diameter Migrandy 30:1 barrier screw (#M22910) driven by a 150 HP DC motor was used to produce the films. The extruder was equipped with a Koch SMX static mixer and the screw speed decreased to 68 rpm from 130 rpm as the Vistamaxx™ 3000 content increased from 0% to 90% in the film. The temperature of the melt decreased to 455° F. from 501° F. (to 235° C. from 260° C.) as the Vistamaxx™ 3000 content increased from 0% to 90% in the film.

The melt was extruded through a five layer Cloeren feed block and 42" (1067 mm) wide EPOCH™ 3201 series slot die manufactured by "The Cloeren Company" operated with a 0.020 inch (0.51 mm) manually adjustable flex die lip. The melt was extruded onto a 36" (914 mm) diameter primary chill roll cored for cooling water circulation and operated with a water inlet temperature of 51-53° F. (11-12° C.). The melt curtain was pinned to the cast roll using an air knife located 4.5 inches (114.3 mm) from the die and 0.25 inches (6.35 mm) from the roll. The carriage position was 2.75 inches (69.85 mm) past vertical with its height set at 4.

The films produced were evaluated using the test procedures identified in Table 2.

TABLE 2

Testing Procedures

| Test Description | Method |
|---|---|
| 1% Secant Modulus | ASTM D882-95a |
| Tensile Test | ASTM D882-95a |
| Elmendorf Tear | ASTM D1922-94 |
| Dart Impact (Method A/B) | ASTM D1709-91 |
| Puncture Test** | ASTM D 5748 |
| Haze | ASTM D1003-95 |
| Gloss | ASTM D2457-90 |
| COF*** | ASTM D 1894 |
| Reblock**** | ASTM D 3354 |
| Average Gauge Mic* | ASTM D374 |
| Film Density | ASTM D1505-90 |
| DSC | ASTM 3417-97 |
| Melt Index | ASTM D1238-94 |

*Calibrated yearly.
**A steel probe is used instead of a Teflon coated probe.
***A mechanical arm is used instead of a string to pull the block.
****Film is separated and then laid-up I/I and heated at 60° C. for 24 hrs under a 4.2 lb load before being tested.

Table 3 shows selected physical properties of 25 μm monolayer films produced. The COF of all films produced exceeded 1.

TABLE 3

25 μm Monolayer Cast Film made from Vistamaxx ™ 3000/PP 2252 Blends

| | | | | |
|---|---|---|---|---|
| Vistamaxx ™ 3000 | 0 | 40 | 60 | 80 |
| PP 2252 | 100 | 60 | 40 | 20 |
| Sample Number | 001 | 003 | 006 | 010 |
| Observed Average Gauge (micron) | 29.2 | 27.9 | 24.1 | 24.4 |
| Haze (%) | 3.24 | 0.24 | 0.35 | 0.42 |
| Gloss 45o MD | 79 | 91 | 90 | 89 |
| Gloss 45o TD | 78 | 91 | 91 | 88 |
| Reblock (I/I, grams) | 65 | 183 | >214 | >214 |
| MD 1% Secant (MPa) | 863 | 270 | 153 | 75 |
| TD 1% Secant (MPa) | 885 | 277 | 169 | 84 |
| MD Tensile @ Yield (MPa) | 27 | 13 | 12 | 8 |
| TD Tensile @ Yield (MPa) | 26 | 11 | 8 | 5 |
| MD Tensile @ 200% (MPa) | 28 | 25 | 32 | 22 |
| MD Tensile @ 200%/ MD Tensile @ Yield Ratio | 1.04 | 1.92 | 2.67 | 2.75 |
| MD Ultimate Tensile (MPa) | 96 | 88 | 86 | 68 |
| TD Ultimate Tensile (MPa) | 57 | 46 | 40 | 36 |
| MD Break Elongation (%) | 606 | 549 | 426 | 421 |
| TD Break Elongation (%) | 854 | 884 | 955 | 1017 |
| MD Elmendorf Tear (g) | 15 | 12 | 6 | 416 |
| TD Elmendorf Tear (g) | 794 | 1001 | 890 | 1027 |
| MD Elmendorf Tear (g/micron) | 0.50 | 0.44 | 0.27 | 17.05 |
| TD Elmendorf Tear (g/micron) | 27.19 | 35.81 | 36.89 | 42.13 |
| Average MD/TD Elmendorf Tear (g/micron) | 13.85 | 18.13 | 18.58 | 29.59 |
| Dart Drop (g, Method A) | <48 | 104 | 83 | 101 |
| Dart Drop (g/micron, Method A) | <1.64 | 3.72 | 3.44 | 4.14 |
| Peak Puncture Force (Newton) | 20.51 | 21.62 | 19.66 | 21.22 |
| Puncture Break Energy (Joule) | 0.69 | 1.05 | 0.93 | 1.35 |
| Peak Puncture Force (Newton/micron) | 0.70 | 0.77 | 0.81 | 0.87 |
| Puncture Break Energy (Joule/micron) | 0.02 | 0.04 | 0.04 | 0.06 |
| MD Shrink (%) | 85 | 81 | 84 | 77 |
| TD Shrink (%) | −34 | −48 | −54 | −53 |

Table 3 shows that high loadings (>/=40%) of Vistamaxx™ 3000 increases the optical/clarity properties (haze and gloss), tack (reblock), stretch capabilities (MD tensile at 200%/MD tensile at yield ratio), toughness (tear, dart, ture properties), and feel of cast PP 2252 film (compare the properties of 1 with those of Films 003, 006 and 010).

It is seen that inclusion of polymeric combinations with 40 wt. % to 80 wt. % of the Vistamaxx™ 3000 improved the optical properties of monolayer films. For example, the haze of the blended films of Table 3 (i.e. films having some Vistamaxx™ 3000 content) ranged from 0.24% to 0.42% as compared to 3.24% for the conventional polypropylene homopolymer single layer film. Additionally, gloss increased to greater than 89 for these blended films as opposed to less than 80 for the conventional film.

It is also seen that inclusion of polymeric combinations with 40 wt. % to 80 wt. % of the Vistamaxx™ 3000 increased the tack of polypropylene homopolymer films. For example, the blended films exhibited reblock (I/I) values of greater than 183 g as compared to values of approximately 64.7 g for the conventional polypropylene homopolymer single layer film.

Inclusion of polymeric combinations with 40 wt. % to 80 wt. % of the Vistamaxx™ 3000 increased the toughness of polypropylene homopolymer single layer films. For example, the blended films had Dart Drop values of 3.72 g/micron to 4.14 g/micron as compared to values of less than 1.64 g/micron for the polypropylene homopolymer single layer film.

Inclusion of polymeric combinations with 40 wt. % to 80 wt. % of the Vistamaxx™ 3000 increased the stretch capability of polypropylene homopolymer single layer films. For example, the blended films had MD tensile at 200% elongation to MD tensile at yield ratios of 1.92 to 2.75 as compared to values of approximately 1.04 for the conventional polypropylene homopolymer single layer film.

Inclusion of polymeric combinations with 40 wt. % to 80 wt. % of the Vistamaxx™ 3000 increased tear resistance (Average MD/TD Elmendorf Tear) values to about 18 to 30 g/micron as compared to values of less than 14 g/micron for the polypropylene homopolymer single layer film.

Additionally, the blended films exhibited Peak Puncture Force values of 0.77 Newtons/micron to 0.87 Newtons/micron as compared to values of 0.70 Newtons/micron for the polypropylene homopolymer single layer film.

Also, the blended films had Puncture Break Energy values 0.04 Joule/micron to 0.06 Joule/micron as compared to a value of 0.02 Joule/micron for the conventional polypropylene homopolymer single layer film.

In certain embodiments, inclusion of polymeric combinations with 40 wt. % to 80 wt. % of the Vistamaxx™ 3000 increased the softness/feel of polypropylene films as evidenced by 1% MD Secant Modulus values of about less than 300 MPa for the blended films as compared to 863 MPa for the conventional polypropylene homopolymer single layer film.

Figure 1:
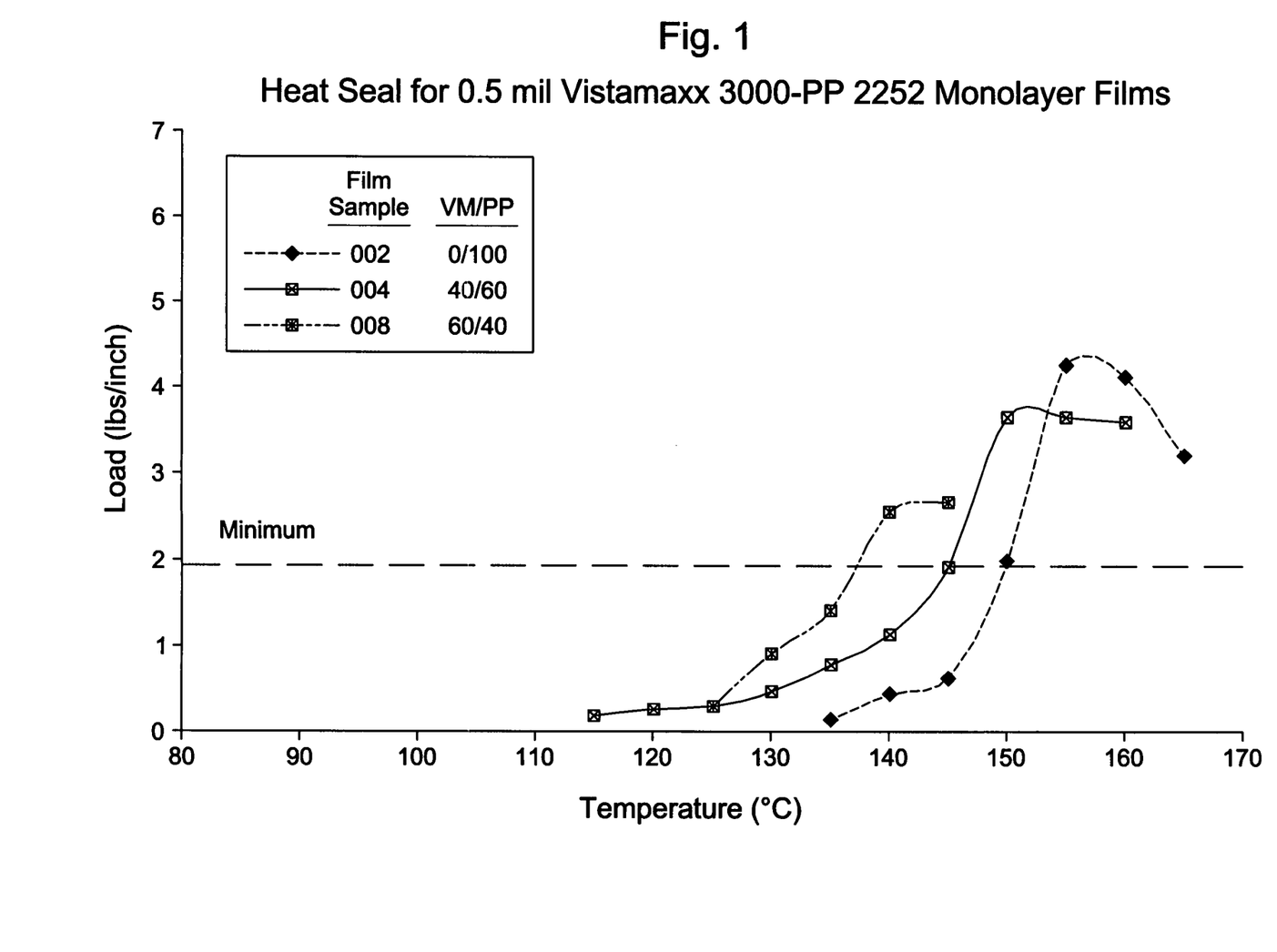
FIG. 1 and FIG. 2 illustrate in graphical form the heat seal performance of monolayer polypropylene films containing 40 wt. % to 80 wt. % Vistamaxx™ 3000.
Figure 2:
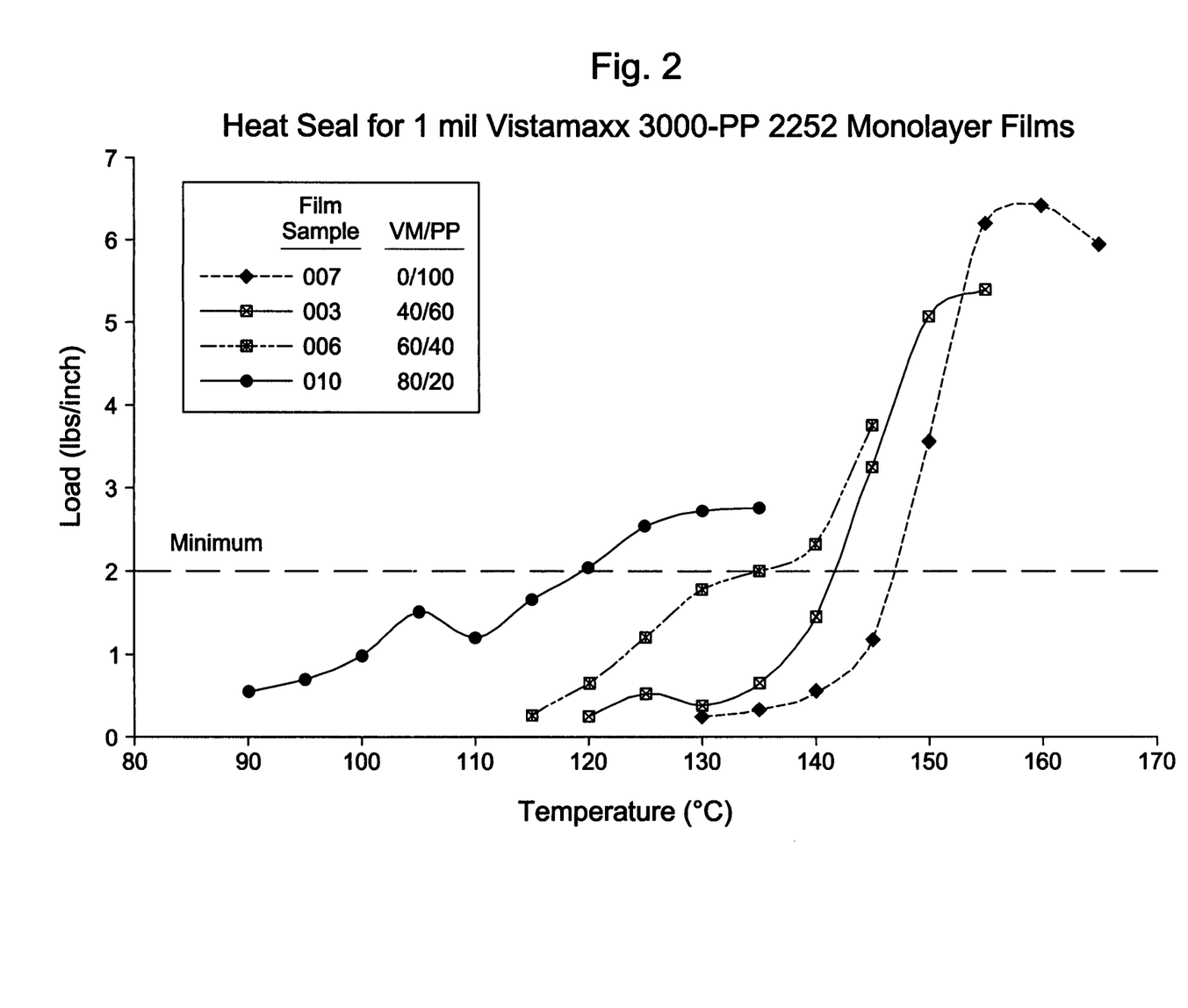

FIG. 1 and FIG. 2 show the heat seal performance of the monolayer polypropylene films containing 40 wt. % to 80 wt. % Vistamaxx™ 3000. Addition of Vistamaxx™ 3000 increased the heat seal performance of the blended films. Specifically, inclusion of the Vistamaxx™ 3000 widened the seal window of the polypropylene films by lowering the film's heat seal temperature to less than 140° C. from over 155° C. For example, films containing 60 wt. % or more Vistamaxx™ 3000 (Films 001, 006 and 010) form breakable seals at temperatures of 135° C. or less, while polypropylene film (Film 001) forms a breakable seal at temperatures greater than 150° C. The seal strength of the films exceeded 2 lbs force. This improvement in seal performance translates into process credits to the converter.

Table 4 shows selected physical properties of 12.7 micron monolayer films made in this study.

TABLE 4

12.5 Micron Monolayer Cast Film made from Vistamaxx™ 3000/PP 2252 Blends

| Vistamaxx™ 3000 | 0 | 40 | 60 |
|---|---|---|---|
| PP 2252 | 100 | 60 | 40 |
| Sample Number | 002 | 004 | 008 |
| Observed Average Gauge (microns) | 13.7 | 14.99 | 12.7 |
| Haze (%) | 1.10 | 0.20 | 0.30 |
| Gloss 45o MD | 86 | 91 | 90 |
| Gloss 45o TD | 87 | 92 | 90 |
| Reblock (I/I, grams) | 98 | 163 | >214 |
| MD 1% Secant (MPa) | 953 | 333 | 190 |
| TD 1% Secant (MPa) | 1005 | 338 | 201 |
| MD Tensile @ Yield (MPa) | 32 | 18 | 15 |
| TD Tensile @ Yield (MPa) | 26 | 13 | 10 |
| MD Tensile @ 200% (MPa) | 57 | 53 | 49 |
| MD Tensile @ 200%/MD Tensile @ Yield Ratio | 1.78 | 2.94 | 3.27 |
| MD Ultimate Tensile (MPa) | 124 | 111 | 97 |
| TD Ultimate Tensile (MPa) | 35 | 35 | 35 |
| MD Break Elongation (%) | 444 | 387 | 337 |
| TD Break Elongation (%) | 278 | 831 | 864 |
| MD Elmendorf Tear (g) | 8 | 3 | 2 |
| TD Elmendorf Tear (g) | 13 | 5 | 4 |
| MD Elmendorf Tear (g/micron) | 0.58 | 5.08 | 4.00 |
| TD Elmendorf Tear (g/micron) | 0.95 | 8.47 | 8.00 |
| Average MD/TD Elmendorf Tear (g/micron) | 0.77 | 7 | 6 |
| Dart Drop (g, Method A) | <48 | <48 | <48 |
| Dart Drop (g/micron, Method A) | <3.50 | <42 | <42 |
| Peak Puncture Force (Newton) | 15.66 | 14.28 | 13.08 |
| Puncture Break Energy (Joule) | 0.57 | 0.69 | 0.67 |

TABLE 4-continued 12.5 Micron Monolayer Cast Film made from Vistamaxx™ 3000/PP 2252 Blends

| Peak Puncture Force (Newton/micron) | 1.14 | 0.95 | 1.03 |
|---|---|---|---|
| Puncture Break Energy (Joule/micron) | 0.04 | 0.05 | 0.05 |
| MD Shrink (%) | 91 | 89 | 86 |
| TD Shrink (%) | −49 | −59 | −48 |

A/B/A coextruded cast films were produced on a Black Clawson line. The films had skins made from 80/20 and 60/40 blends of Vistamaxx™ 3000 and PP 2252, and cores made from 100% PP 2252 (see Table 5). The cores compose 60% and 80% of the films. The films are 12.5 micron and 25.4 micron thick.

TABLE 5

A/B/A Coextruded Cast Films with PP 2252 Cores (Layer B) and Vistamaxx™ -PP 2252 Skins

| Sample No. | Layer A's Composition (Percent) | | Layer Distribution | | | Film Thickness (micron) |
|---|---|---|---|---|---|---|
| | VM 3000 | PP 2252 | A | B | A | |
| 013 | 80 | 20 | 10 | 80 | 10 | 25.4 |
| 014 | | | | | | 12.7 |
| 015 | | | 20 | 60 | 20 | 25.4 |
| 016 | | | | | | 12.7 |
| 017 | 60 | 40 | 10 | 80 | 10 | 25.4 |
| 018 | | | | | | 12.7 |
| 019 | | | 20 | 60 | 20 | 25.4 |

The Black Clawson line was equipped with two 3½" (88.9 mm) diameter screws. The extruder feeding the core of the film was equipped with a Migrandy 30:1 barrier screw (#M22910) and 150 HP DC drive. The extruder feeding the skin of the film was equipped with a Davis Standard (DSBII) 30:1 (serial#XA525904JT) and 150 HP DC drive. Both extruders were equipped with Koch SMX static mixers.

The extruder feeding the core layer of the film was operated with a screw speed that increased from 78 rpm to 107 rpm as the PP 2252 core layer increased from 60% to 80%. The temperature of the melt increased from 486° F. to 504° F. (252° C. to 262° C.) as the PP 2252 core layer increased from 60% to 80%.

The extruder feeding the skin layer of the film was operated with a screw speed that increased from 12 rpm to 29 rpm as the total skin layers increased from 20% to 40%. The temperature of the melt increased from 487° F. to 490° F. (252° C. to 254° C.) as the core layer decreased from 40% to 20%.

The combined melts were extruded through a five layer Cloeren feed block and 42" (1067 mm) wide EPOCH™ 3201 series slot die manufactured by The Cloeren Company operated with a 0.020 inch (0.51 mm) manually adjustable flex die lip. The melt was extruded onto a 36" (914 mm) diameter primary chill roll cored for cooling water circulation and operated with a water inlet temperature of 51-53° F. (11-12° C.). The melt curtain was pinned to the cast roll using an air knife located 4.5 inches (114.3 mm) from the die and 0.25 inches (6.35 mm) from the roll. The carriage position was 2.75 inches (69.85 mm) from vertical with its height set at 4.

Selected physical properties of the coextruded films made in this study are presented in Table 6. The COF of all the films exceeded 1.

TABLE 6

Cast Film with PP 2252 Core with indicated Layer and Skin Composition

| | Coextruded Films Layer Distribution | | | | | | | Monolayer | |
|---|---|---|---|---|---|---|---|---|---|
| | 10/80/10 A/B/A | | | | 20/60/20 A/B/A | | | Reference Films | |
| | Skin Compositions (Percent) | | | | | | | | |
| Vistamaxx ™ 3000 | 60 | 80 | 60 | 80 | 80 | 60 | 80 | 0 | 0 |
| PP 2252 | 40 | 20 | 40 | 20 | 20 | 40 | 20 | 100 | 100 |
| Sample Number | 018 | 014 | 017 | 013 | 016 | 019 | 015 | 2 | 1 |
| Observed Average Gauge (microns) | 14.0 | 12.4 | 27.2 | 25.7 | 13.7 | 24.6 | 24.4 | 13.7 | 29.2 |
| Haze (%) | 0.56 | 0.63 | 0.60 | 1.71 | 0.56 | 0.52 | 0.56 | 1.10 | 3.24 |
| Gloss 45o MD | 90 | 89 | 90 | 89 | 89 | 90 | 90 | 86 | 79 |
| Gloss 45o TD | 89 | 866 | 89 | 87 | 87 | 90 | 89 | 87 | 78 |
| Reblock (I/I, grams) | >214 | >214 | >214 | >214 | >214 | >214 | >214 | 98 | 65 |
| MD 1% Secant (MPa) | 821 | 875 | 694 | 763 | 679 | 633 | 600 | 953 | 863 |
| TD 1% Secant (MPa) | 837 | 881 | 731 | 751 | 685 | 607 | 614 | 1005 | 885 |
| MD Tensile @ Yield (MPa) | 28 | 28 | 23 | 23 | 26 | 20 | 19 | 32 | 27 |
| TD Tensile @ Yield (MPa) | 21 | 26 | 21 | 23 | 21 | 18 | 18 | 26 | 26 |
| MD Tensile @ 200% (MPa) | 50 | 51 | 28 | 27 | 63 | 29 | 26 | 57 | 28 |
| MD Tensile @ 200%/MD Tensile @ Yield Ratio | 1.79 | 1.82 | 1.22 | 1.17 | 2.42 | 1.45 | 1.37 | 1.78 | 1.04 |
| MD Ultimate Tensile (MPa) | 1045 | 115 | 98 | 93 | 103 | 97 | 90 | 124 | 96 |
| TD Ultimate Tensile (MPa) | 36 | 36 | 50 | 49 | 44 | 48 | 47 | 35 | 57 |
| MD Break Elongation (%) | 408 | 453 | 591 | 610 | 328 | 563 | 560 | 444 | 606 |
| TD Break Elongation (%) | 718 | 433 | 841 | 825 | 830 | 862 | 877 | 278 | 854 |
| MD Elmendorf Tear (g) | 5 | 7 | 12 | 12 | 5 | 9 | 13 | 8 | 15 |
| TD Elmendorf Tear (g) | 528 | 391 | 1148 | 958 | 429 | 1084 | 1039 | 13 | 794 |
| MD Elmendorf Tear (g/micron) | 0.36 | 0.56 | 0.44 | 0.47 | 0.36 | 0.37 | 0.53 | 0.58 | 0.51 |
| TD Elmendorf Tear (g/micron) | 37.71 | 31.53 | 42.21 | 37.28 | 31.31 | 44.07 | 42.58 | 0.95 | 27.19 |
| Vistamaxx ™ 3000 | 60 | 80 | 60 | 80 | 80 | 60 | 80 | 0 | 0 |
| PP 2252 | 40 | 20 | 40 | 20 | 20 | 40 | 20 | 100 | 100 |
| Sample Number | 018 | 014 | 017 | 013 | 016 | 019 | 015 | 2 | 1 |
| Average MD/TD Elmendorf Tear (g/micron) | 19.04 | 16.05 | 21.32 | 18.87 | 15.84 | 22.22 | 21.56 | 0.77 | 13.85 |
| Dart Drop (g, Method A) | <48 | <48 | <48 | <48 | <48 | <48 | 77 | <48 | <48 |
| Dart Drop (g/micron, Method A) | <3.43 | <3.87 | <1.76 | <1.87 | <3.50 | <1.95 | 3.16 | <3.50 | <1.64 |
| Peak Puncture Force (Newton) | 17.08 | 21.04 | 26.11 | 31.45 | 22.28 | 26.02 | 31.22 | 15.66 | 20.51 |
| Puncture Break Energy (Joule) | 0.61 | 1.03 | 1.13 | 1.57 | 1.05 | 1.25 | 1.77 | 0.57 | 0.69 |
| Peak Puncture Force (Newton/micron) | 1.22 | 1.69 | 0.96 | 1.23 | 1.62 | 1.06 | 1.28 | 1.14 | 0.70 |
| Puncture Break Energy (Joule/micron) | 0.04 | 0.08 | 0.04 | 0.06 | 0.08 | 0.05 | 0.07 | 0.04 | 0.02 |
| MD Shrink (%) | 89 | 87 | 83 | 81 | 8 | 85 | 80 | 91 | 85 |
| TD Shrink (%) | −50 | −50 | −39 | −36 | −38 | −43 | −36 | −49 | −34 |

Table 6 shows the co-extruded films have superior optical/clarity properties, tack, stretch capabilities, and toughness as compared to cast PP 2252 film, while retaining stiffness and lifting ability (compare the properties of Film 001 with those of Films 013, 015, 017 and 019).

Co-extrusion of the co-extruded films of Table 6 increased the optical/clarity properties of PP 2252 film over that of the conventional polypropylene film. The co-extruded film's haze decreased to 0.52-1.71% from 3.24% for the conventional film, while the gloss of the co-extruded film increased to greater than 88 from less than 80 for the conventional film.

Co-extrusion increased the tack of PP 2252 film. The Reblock (I/I) values of the co-extruded films increased to greater than 214 g from 64.7 g of the conventional film.

Co-extrusion increased the stretch capability of PP 2252 film. The MD Tensile at 200% Elongation to MD Tensile at Yield ratio increased to 1.17-2.42 for the co-extruded films as opposed to 1.04 for the conventional film.

Co-extrusion increased the toughness of PP 2252 films. The Dart Drop performance of the co-extruded film was determined using Method A, this value increased to 3.16 g/micron for Film 19 from less than 1.64 g/micron for Film 1. The co-extruded film's tear resistance (Average MD/TD Elmendorf Tear) increased to 18.87-22.22 g/micron from less than 13.85 g/micron of the conventional film. The co-extruded film's Peak Puncture Force increased to 0.96-1.28 Newtons/micron from 0.70 Newtons/micron of the conventional film. The Puncture Break Energy values of the co-extruded film increased to 0.04-0.07 Joule/micron from 0.02 Joule/micron of the conventional film.

Co-extrusion increased the softness/feel of PP 2252 film. The co-extruded film's 1% MD Secant Modulus (600-763 MPa) was less than that of the PP 2252 film (863 MPa).

Co-extrusion maintained the lifting ability of the films. MD Tensile at Yield (19-23 MPa) values of the co-extruded film were sufficient.

Figure 3:
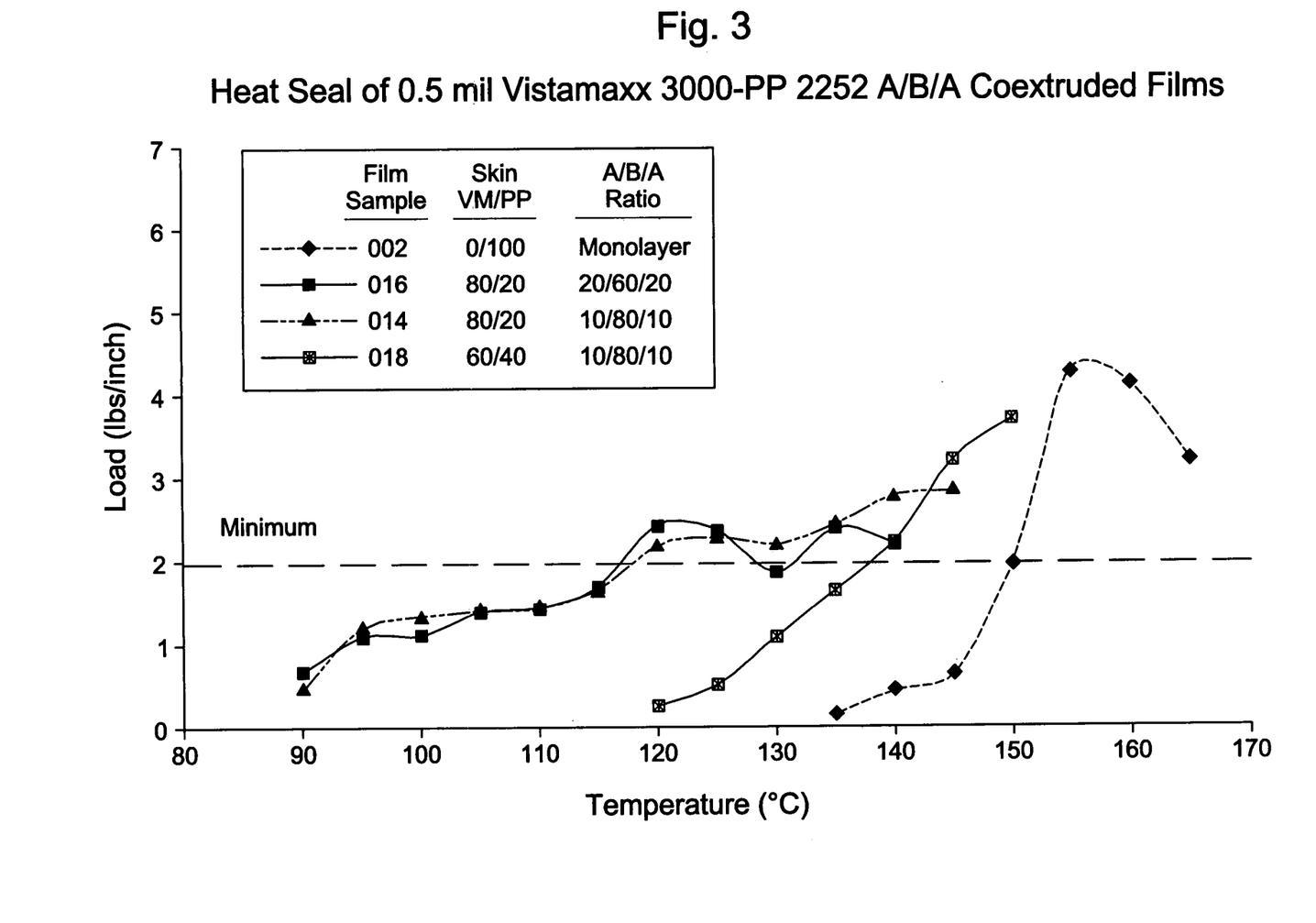
FIG. 3 and FIG. 4 provide the heat seal performance of coextruded PP 2252 films containing 60% to 80% Vistamaxx™ 3000 in the respective skins.
Figure 4:
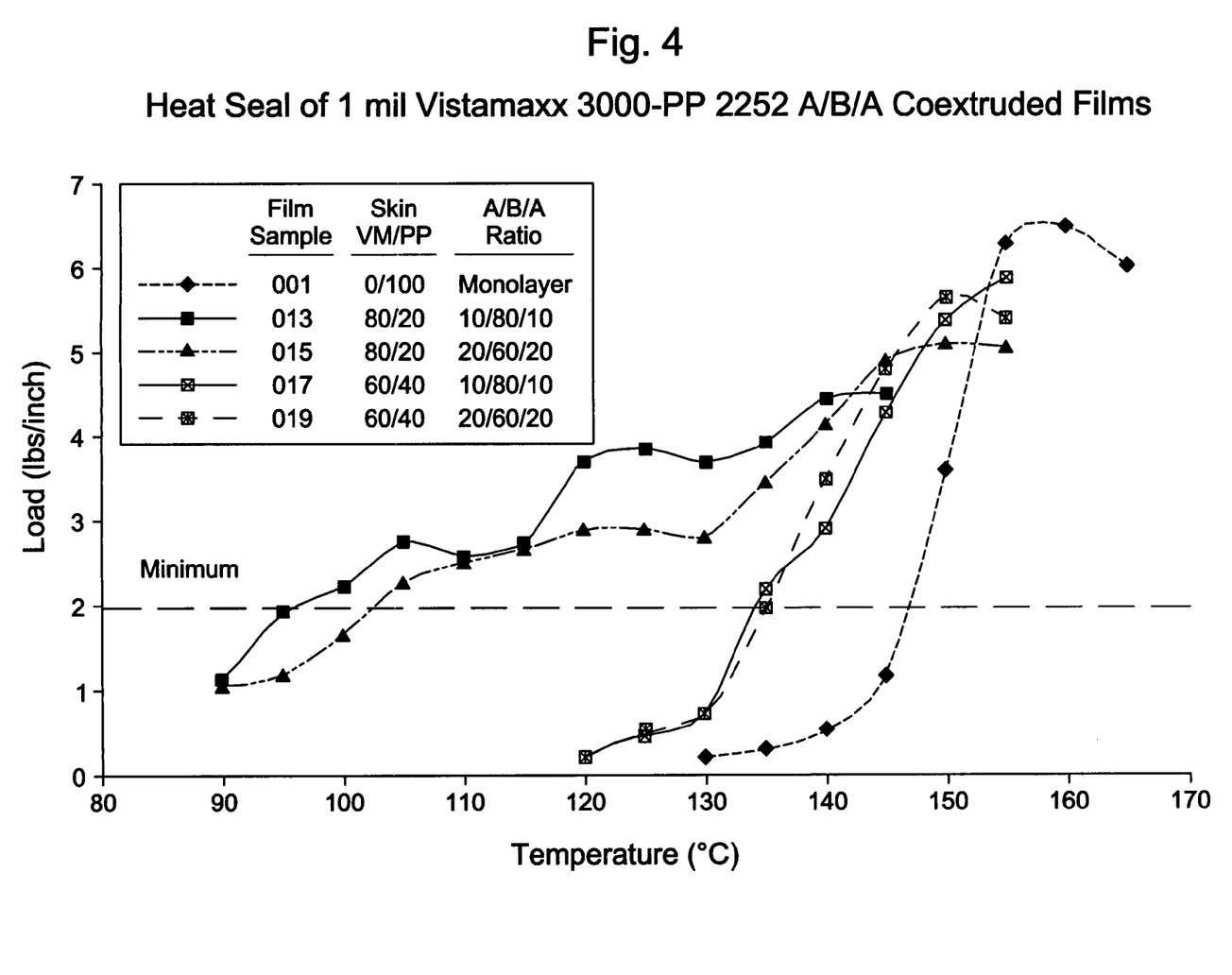

FIG. 3 and FIG. 4 show the heat seal performance of the coextruded PP 2252 films containing 60% to 80% Vistamaxx™ 3000 in the skins. Addition of Vistamaxx™ 3000 to the PP 2252 skins of the film increased the heat seal performance of the films with the increase in seal performance increasing with an increase in the loading of Vistamaxx™ 3000. Specifically, inclusion of the Vistamaxx™ 3000 widened the seal window of PP 2252 films by lowering the heat seal temperature of the co-extruded films to less than 140° C. from over 155° C. For example, film layers incorporating 60 wt. % or more of the Vistamaxx™ 3000 (Films 013-019) formed breakable seals at temperatures of 135° C. or less, while the PP 2252 films (Films 1 and 2) formed breakable seals at temperatures greater than 150° C. The seal strength values of the films exceeded 2 lbs force. This improvement in seal performance translates into process credits to the converter.

All patents and publications referred to herein are hereby incorporated by reference in their entireties.

Although the present invention and its advantages have been described in detail, it should be understood that various changes, substitutions, and alterations could be made without departing from the spirit and scope of the invention as defined by the following claims.

We claim:

1. An A/B/A coextruded inelastic film comprising a core layer B disposed between two skin layers A,
   wherein the core layer comprises 60 wt. % to 80 wt. % of the inelastic film, and consists of polypropylene homopolymer;
   wherein each skin layer respectively composes 10 wt. % to 20 wt. % of the inelastic film, and wherein each skin layer consists of a polymeric combination, the polymeric combination consisting of:
      from about 60 wt. % to about 80 wt. % of a first polymeric component consisting of from about 80 to about 90 wt. % propylene-derived units and from about 10 to about 20 wt. % ethylene-derived units, wherein the propylene-derived units have an isotactic triad fraction of about 65% to about 99% propylene-derived units, and the first polymeric component has a heat of fusion of 7.0 J/g to 30 J/g, and a melt flow rate (230° C., 2.16 kg) of about 8 g/10 min;
      (ii) from about 20 wt. % to about 40 wt. % of a second polymeric component consisting of a polypropylene homopolymer; and
      (iii) optionally one or more additives;
   wherein the combined weight of the first polymeric component and the second polymeric component comprises from about 80 wt. % to about 100 wt. % of the polymeric combination; and
   wherein the inelastic film has the following combination of properties: an average Machine Direction (MD) and Transverse Direction (TD) Elmendorf tear resistance of 15.84 to 22.22 g/micron as determined according to ASTM D1922-94; a haze of 0.52% to 0.63% as determined according to ASTM D1003-95; and a heat seal temperature between 95° C. and 135° C. as determined for 1 mil thick inelastic film.

2. The inelastic film of claim 1 wherein the film has a permanent set value of at least 100%.

3. The inelastic film of claim 1 wherein the one or more additives are each selected from the group consisting of a filler, a pigment, a coloring agent, a processing oil, a plasticizer, and mixtures thereof.

4. The inelastic film of claim 1 wherein one of the one or more additives is a non-functionalized plasticizer wherein the non-functionalized plasticizer has a kinematic viscosity of at least 2 cSt at 100° C.

5. The inelastic film of claim 4 wherein the non-functionalized plasticizer has a flashpoint of at least 200° C.

6. A method for forming an A/B/A coextruded inelastic film, the method comprising coextruding a core layer B of polypropylene homopolymer with two skin layers A, each skin layer consisting of a polymeric combination, wherein the polymeric combination consists of:
   (i) from about 60 wt. % to about 80 wt. % of a first polymeric component consisting of from about 80 to about 90 wt. % propylene-derived units and from about 10 to about 20 wt. % ethylene-derived units, wherein the propylene-derived units have an isotactic triad fraction of about 65% to about 99% propylene-derived units and the first polymeric component has a heat of fusion of 7.0 J/g to 30 J/g, and a melt flow rate (230° C., 2.16 kg) of about 8 g/10 min;
   (ii) from about 20 wt. % to about 40 wt. % of a second polymeric component consisting of a polypropylene homopolymer; and
   (iii) optionally one or more additives;
      wherein the combined weights of the first polymeric component and the second polymeric component comprise from about 80 wt. % to about 100 wt. % of the polymeric combination; and
   wherein said coextruding forms the A/B/A inelastic film, said A/B/A inelastic film comprising 60 wt. % to 80 wt. % of the core layer B disposed between 10 wt. % to 20 wt. % each of the two skin layers A; and further wherein A/B/A inelastic film has the following combination of properties: an average Machine Direction (MD) and Transverse Direction (TD) Elmendorf tear resistance of 15.84 to 22.22 g/micron as determined according to ASTM D1922-94; a haze of 0.52% to 0.63% as determined according to ASTM D1003-95; and a heat seal temperature between 95° C. and 135° C. as determined for 1 mil thick inelastic film.

7. The method of claim 6, the one or more additives are each selected from the group consisting of a filler, a pigment, a coloring agent, a processing oil, a plasticizer, and mixtures thereof.

8. The method of claim 6, wherein one of the one or more additives is a non-functionalized plasticizer wherein the non-functionalized plasticizer has a kinematic viscosity of at least 2 cSt at 100° C.

9. The method of claim 8 wherein the non-functionalized plasticizer has a flashpoint of at least 200° C.

10. The inelastic film of claim 6, wherein the first polymeric component is present in the polymeric combination in an amount of about 80 wt. %.

11. The inelastic film of claim 6, wherein the first polymeric component is present in the polymeric combination in an amount of about 60 wt. %.

* * * * *

UNITED STATES PATENT AND TRADEMARK OFFICE
CERTIFICATE OF CORRECTION

| | | |
|---|---|---|
| PATENT NO. | : 8,927,108 B2 | Page 1 of 1 |
| APPLICATION NO. | : 11/639789 | |
| DATED | : January 6, 2015 | |
| INVENTOR(S) | : David Michael Fiscus, Narayanaswami Raja Dharmarajan and Michael Charles Bulawa | |

It is certified that error appears in the above-identified patent and that said Letters Patent is hereby corrected as shown below:

In the Claims

In Claim 1, at Column 23, Line 8, delete "comprises" and replace with --composes--.

In Claim 1, at Column 23, Line 15, at the beginning of the line please insert --(i)--.

Signed and Sealed this
Fifth Day of May, 2015

Michelle K. Lee
*Director of the United States Patent and Trademark Office*